3,158,433
SEISMIC SYSTEM
Warren A. Alexander, Donald J. Robinson, and Daemon
L. Lighthizer, Tulsa, Okla., assignors to Jersey Production Research Company, a corporation of Delaware
Filed Nov. 2, 1962, Ser. No. 234,975
10 Claims. (Cl. 346—110)

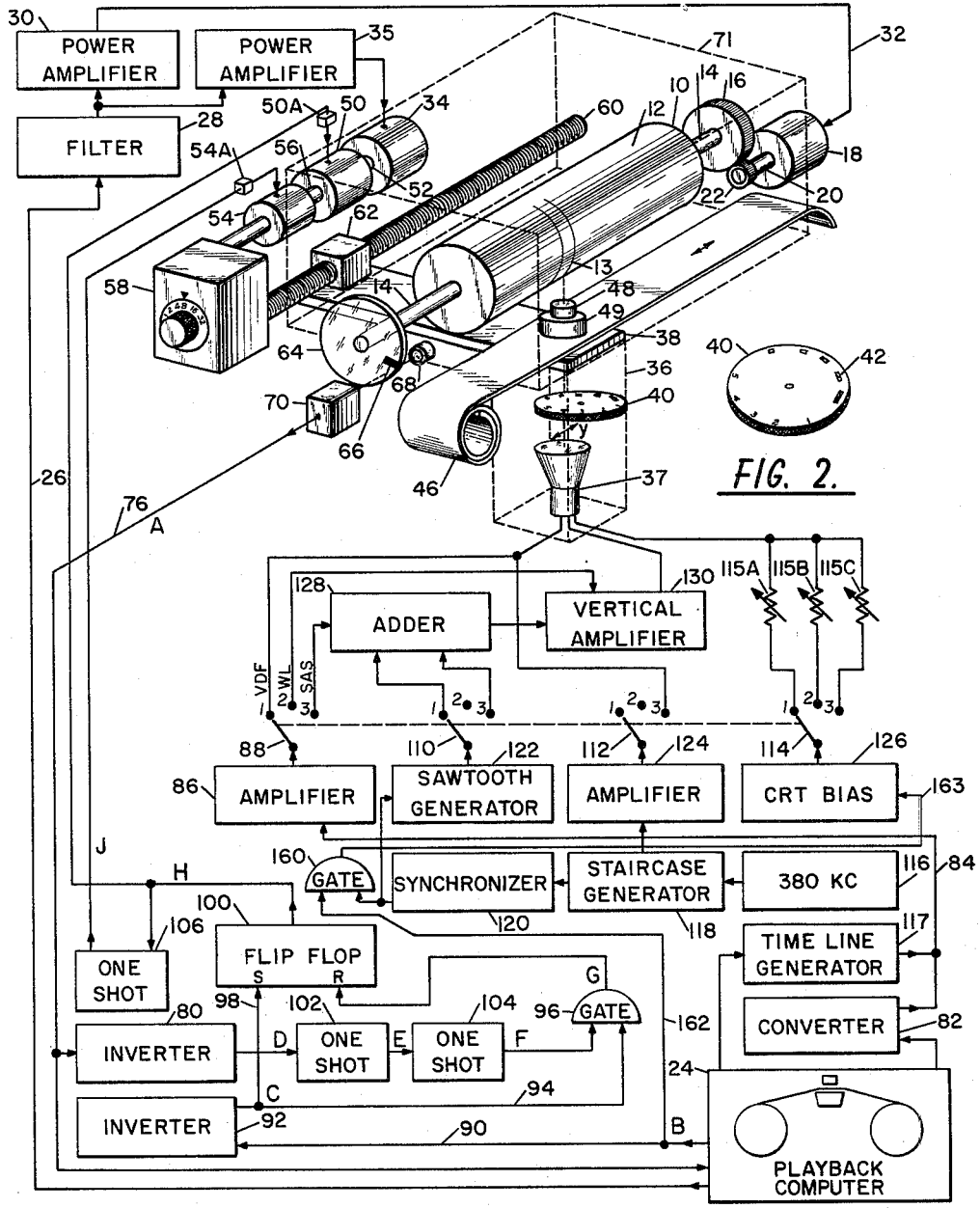

This invention concerns the display of signals having amplitude variations with respect to time. It relates especially to the preparation of a display of information contained in a seismic section.

Geophysical prospecting using artificially induced seismis disturbances has found wide application in the search for petroleum and other products. It is the general practice to initiate a seismic disturbance at a point near the surface of the earth to direct seismic waves downwardly into the earth from that point. The waves continue to travel downwardly within the earth until they encounter discontinuities in the earth's structure in the form of various substrata formations and the like. These discontinuities have the effect of reflecting a portion of the seismic waves back toward the surface of the earth. By arranging a plurality of geophones or other seismic transducers at spaced distances from the seismic disturbance point, it is possible to detect the arrival of the reflected seismic waves at the surface of the earth. These detected waves are translated into electrical impulses which are then indicative of the character of the ground motion and are usually referred to collectively as a seismic signal. The seismic signal is in effect a composite signal made up of a plurality of electrical signals varying in frequency and amplitude.

The seismic signals are detected at a plurality of locations. The various signals are arranged in a side-by-side relationship on a display medium and collectively form what is commonly called a seismic section. The composite signal, or its display, from each location is commonly referred to as a seismic trace. The seismic section is in effect a cross-sectional picture or display of a cross-section through the portion of the earth being surveyed. The seismic section is most commonly displayed by photographic methods. However, before the seismic section takes on a true meaning, many and various well known corrections such as spread, time, velocity, etc. have to be applied to the various traces which make up the section.

Interest is now being shown in processing seismic sections through high-speed, digital computers which apply the various corrections to the individual traces and perform such other operations thereon as may be necessary or desirable. In order that the processed seismic section can be properly analyzed by interpreters, this information should be displayed in visual form. Present photographing techniques or systems are not adequate or suitable for this type recording. It is therefore an object of this invention to provide a high-speed photographing system for use with a digital computer which for example has been used to process a seismic section.

The nature of the invention can be readily understood from the following description taken in conjunction with the drawing in which:

FIG. 1 illustrates partly in perspective and partly in block diagram form the best mode contemplated for carrying out the invention;

FIG. 2 illustrates a mask for use with the system of FIG. 1;

Figure 3:
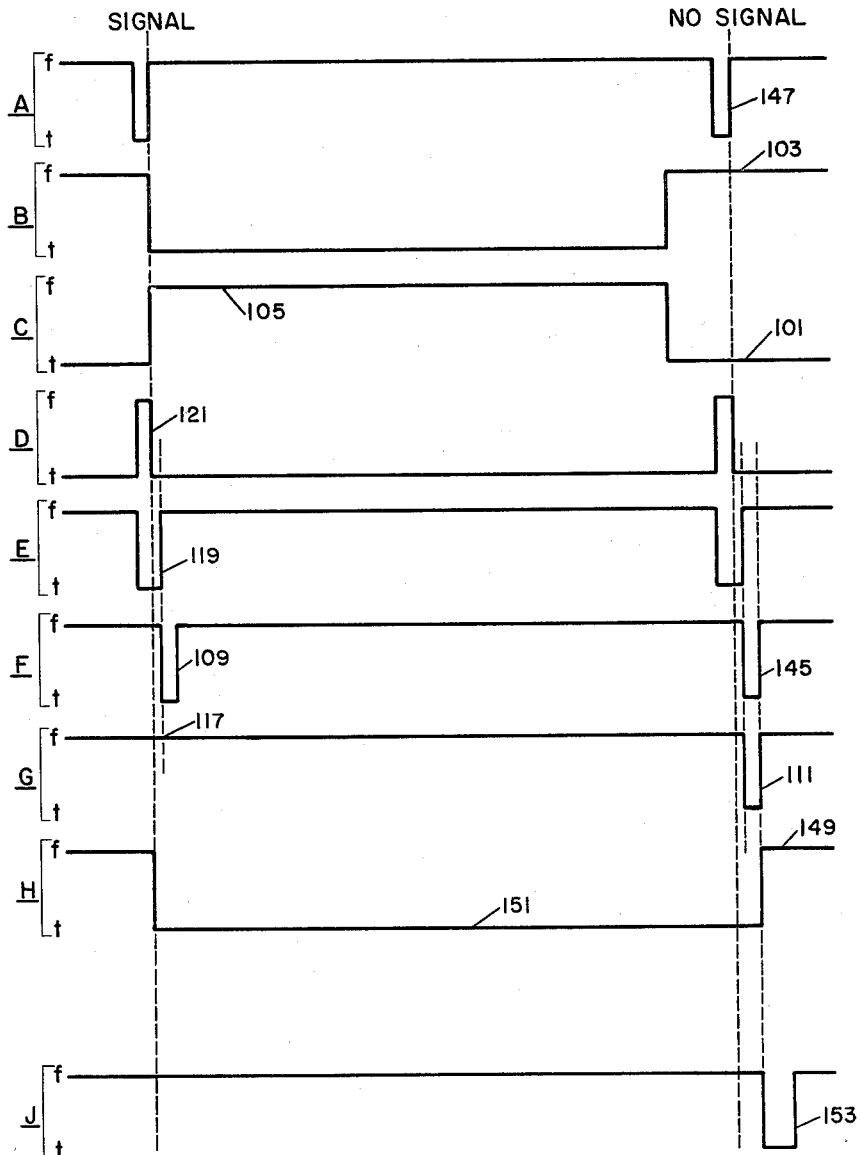
FIG. 3 illustrates waveforms which occur at various components of the apparatus of FIG. 1 and are useful in explaining the nature of the invention.

Illustrated on FIG. 1 is a recording drum 10 upon which is mounted a photographic recording medium 12 having a channel 13 indicated thereon to illustrate the width of recording of a seismic signal as will be more fully explained hereinafter. A shaft 14 extends through drum 10 and supports it. The shaft 14 is supported from a table or the like by conventional means not shown. On one end of shaft 14 is gear 16. A first motor 18 having outlet shaft 20 and driving gear 22 is provided such that the teeth of gears 22 mesh with the teeth of gears 16 to rotate drum 10 through shaft 14.

It is desired that the speed of drive motor 18 and the size of gears 16 and 22 be such that drum 10 makes one rotation during the output of one complete seismic signal (or selected portion thereof) from a storage unit such as digital computer 24. To assure synchronization of this, a 60 cycle (or other suitable frequency) signal is obtained from the digital computer 24 through line 26. This signal is filtered as necessary in filter 28. The output of filter 28 is fed to a power amplifier 30 whose output is fed through line 32 to motor 18. Means for synchronizing the beginning of reading a signal from storage 24 with a given position of drum 10 will be discussed hereinafter.

Having described how drum 10 is rotated with respect to an output signal from digital computer 24, attention will now be directed toward the structure or system for exposing the film on the drum 10. An oscilloscope means or cathode ray tube means 37 is supported from horizontal support bar 38. A case enclosing the cathode ray tube means 37 is indicated by dotted lines 36. A mask 40 is mounted in case 36 just above the face of the cathode ray tube. Mask 40 has a series of varying-width, radial slots 42, which are used to control the width of the individual seismic trace print-out. The mask is further arranged such that the radial slot through which the light beam of the cathode ray tube passes is parallel to the Y axis of the cathode ray tube. As will be seen, the X axis of the cathode ray tube is in a more or less fixed condition. The X sweep factor effect is obtained by the rotation of drum 10. Mounted above horizontal support bar 38 is a metallic ribbon or the like which unrolls from roll 46. Metallic roll 46 is attached to horizontal bar 38 and moves with it. A lens means 48 is mounted in an opening 49 which extends through metallic ribbon 46 and horizontal plate 38 and is positioned directly above a slit in mask 40 when that particular slit is parallel to the Y axis of the cathode ray tube 37. Any light shining through the selected slit or slot 42 of mask 40 passes through lens 48 and directly onto film 12 of drum 10. The character of the light beam can vary (a) in intensity, and (b) in position along the Y axis of the oscilloscope in a selected area determined by slot 42. Proper control of these variables give selected visual display types. Drum 10, lens 48 and associated parts are enclosed in a light-tight box or enclosure as indicated by dotted lines 71.

Attention will now be directed to the part of the system which moves the cathode ray tube laterally along its Y axis. A driving motor 34 receives power from power amplifier 35 which receives a signal from filter 28 similarly as does motor 18. Thus motors 34 and 18 are synchronized with digital computer 24. Motor 34 is connected to clutch 50 through shaft 52. The output shaft 56 from clutch 50 is fed to a gear reducing means 58. Mounted on shaft 56 is a brake means 54 whose operation will be discussed hereinafter. Gear reduction means 58 is variable and can be selected for selected gear reduction ratio. The output of gear reduction means 58 is a threaded shaft 60 which passes through traveling nut 62. Traveling nut 62 is rigidly attached to horizontal member 38. Thus lateral movement of traveling nut 62 along shaft 60 drives horizontal member 38 and cathode ray tube 37. The lateral movement of the cathode ray tube 37 is slow compared to the speed of rotation of drum 10. The lateral movement of cathode ray tube 37 during one revolution of drum 10, is about the selected width of a seismic trace, e.g., channel 13.

Mounted on shaft 14 opposite driving gear 16 is a transparent disc 64 having an opaque strip 66. Mounted on one side, by means not shown, of disc 64 is light source 68 and on the opposite side is a photoelectric cell 70. This mechanism is used to obtain a synchronous signal. Each time the opaque strip 66 interrupts the light from light source 68, the photoelectric cell 70 puts out a pulse such as illustrated in waveform A of FIG. 3. The output signal from photoelectric cell 70 is fed through conduit 76 to digital playback means 24 which can, for example, include a DR 1 Plotter and a PB 250 Computer manufactured by Packard Bell Computer, Los Angeles 25, California. This pulse from photoelectric cell 70 (on line 76) is the synchronization pulse and informs the digital computer to put out the next succeeding seismic signal. The output information from digital computer 24 is fed through a digital-to-analog converter 82, then through conductor 84 to amplifier 86. The output of amplifier 86 is then fed through switch 88.

Attention will now be directed toward the printing of the seismic signal from digital computer 24. There are shown four switches 88, 110, 112 and 114, each of which have positions 1, 2 and 3 and are ganged such that each is in the same numerical position as the other switches. When in the 1 position, a variable density signal is printed. Variable density presentation of seismic section is well known and is that type presentation in which a channel is assigned for each seismic signal and the density or the intensity of the channel from white through various shades of gray to black are normally representative of amplitude functions of the seismic signal but can be representative of other features of the signal such as frequency. Various colors can be used. When the switches are in the No. 2 position, a wiggly line trace is recorded. This is perhaps the oldest of the ways of recording a seismic signal and is essentially a line presentation of the analog of the seismic signal. When in the No. 3 position, the seismic signals are presented in stacked amplitude style. This style will be explained more fully hereinafter.

When in the N. 1 position, a variable density presentation is made on the recording medium 12. This is accomplished by (1) controlling the intensity of the light beam of the cathode ray tube 37 by the analog of the seismic signal. This is accomplished in FIG. 1 by feeding the output from converter 82 through amplifier 86, switch 88 in the 1 position to the Z axis of the cathode ray tube, and (2) sweeping the beam of light across the Y axis. Mask 40 is placed over channel 13 and the width of slit 42 corresponds to the width of channel 13 indicated on recording medium 12. The beam is so positioned on the face of the cathode ray tube in connection with the mask and the optical lens, that when sweeping back and forth along the Y axis, the light beam, during a selected portion of the sweep, passes through slot 42 through optical lens 48 onto the recording medium 12 on drum 10. The Y sweep is obtained from sawtooth generator 122 which is fed through adder 128 to vertical amplifier 130 to the Y axis of the cathode ray tube. When the switches are in the 1 position, there is nothing added to the sawtooth generator signal. The sawtooth generator is of a character to have a frequency many times that of the signal being processed. For example, it may have a frequency as high as 100 to 1, or more, times the frequency of the signal being recorded. When in the 1 position of the switches, the beam of the oscilloscope device or cathode ray tube is repeatedly swept laterally along the Y axis. The intensity of the beam is a function of the seismic signal. As the drum 10 rotates, the surface of recording medium 12 is exposed about its periphery for a width approximately the same as the width of slit 42, for example, of mask 40. The drum rotating has essentially the same effect as applying the sweep to the X axis of the cathode ray tube. However, in this system the X axis of the cathode ray tube is inoperative. As the drum rotates, then the exposure of the channel as illustrated at 13 becomes a variable density presentation of the seismic signal.

When it is desired to have a wiggly line presentation of the seismic signal, the switches are placed in their No. 2 position. When in this position, the beam of light is given a constant intensity and the seismic signal is fed through switch 88 in its 2 position to vertical amplifier 130 which is connected to the Y axis of cathode ray tube 37. The light beam of the cathode ray tube is then moved vertically as a function of the amplitude, for example, of the seismic signal. The vertical amplification is adjusted such that the normal maximum movement of the beam of light is such that it will fall within channel 13 on the recording medium. Mask 40 is thus set so that its slit 42 is at a width corresponding to the desired width of channel 13. Thus as the drum rotates, it will be exposed to a beam of light which varies along the Y axis, thus imparting a wiggly trace signal upon the recording medium in channel 13.

Figure 4:
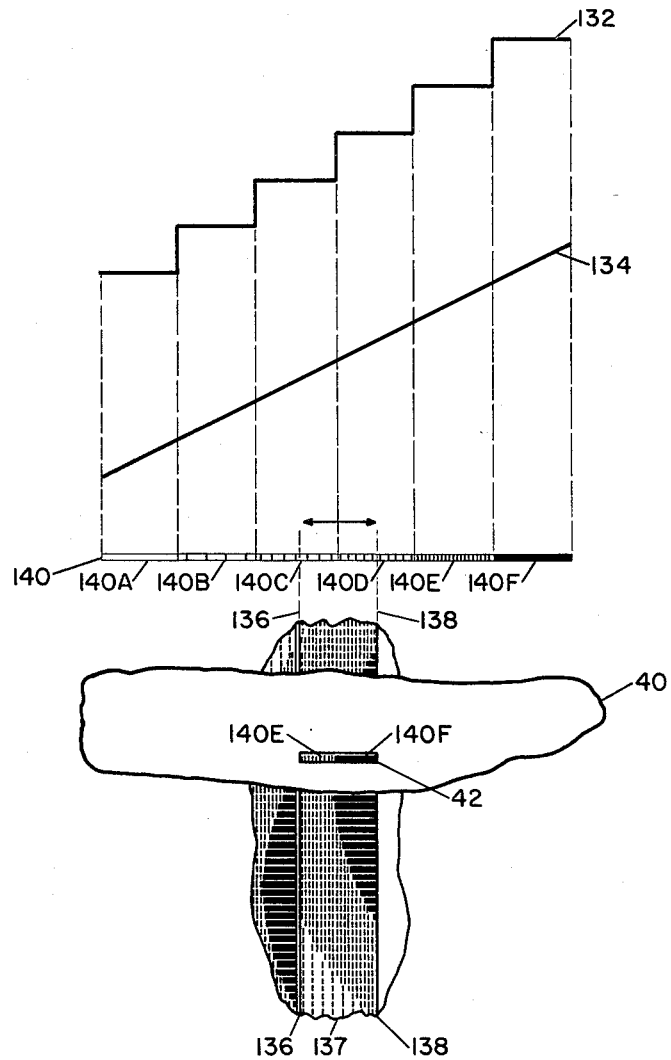
FIG. 4 illustrates waveforms and displays useful in explaining a stacked amplitude presentation of the seismic section.

Attention is now directed also to FIG. 4 in explaining how the stacked amplitude presentation is made when switches 88, 110, 112, and 114 are in their No. 3 positions. Illustrated in FIG. 1 is a high frequency source 116 which is shown as 380 kc. although the particular frequency is not critical. The output of source 116 is fed to staircase generator 118 which generates repeatedly a series of identical stairsteps which, for example, can containing 6 levels as indicated by waveform 132 of FIG. 4. The output of staircase generator 118 is fed to a synchronizer or trigger circuit 120. Synchronizer circuit 120 is of a character to reset sawtooth generator 122 to zero each time that the staircase generator 118 is set to zero. Synchronizer circuit 120 has an output trigger pulse each time staircase generator 122 is set to zero; this output trigger pulse triggers sawtooth generator 122 in a conventional manner. As will be seen, this feature is important in the stacked amplitude display system. When switches 88, 110, 112 and 114 are in their No. 3 position, the intensity of the light beam in cathode ray tube 37 is controlled by staircase waveform 132. Illustrated in FIG. 4 is a channel between lines 136 and 138. This channel corresponds to the channel 13 on the recording medium 12 which also corresponds to the width of the particular slit 42 selected in mask 40. Also illustrated in FIG. 4 is one period of a stairstep waveform illustrated as 132 and ramp 134 of one sawtooth of the sawtooth waveform. The output of staircase generator 118 is fed through amplifier 124 and the 3 position of switch 112 to the Z axis of cathode ray tube 37. The duration or period of waveforms 132 and 134 correspond in time. In operation, if no seismic signal is being supplied through amplifier 86 and switch 88 in the 3 position to adder 128, the beam of light is swept across the face of the cathode ray tube in accordance with waveform 134. When switches 88, 110, 112 and 114 are in their No. 3 position, the intensity of the beam during this sweep is in accordance with, and controlled by staircase waveform 132. To the eye then, there appears on the cathode ray tube under such conditions a variable light intensity or wedge, such as illustrated at 140. Line or "wedge" 140 has different sections of different intensities varying from white at 140A to black at 140F. When there is no seismic signal, the part of line 140 that is recorded is indicated between lines 136 and 138, extended by dotted lines to indicate the width of channel 13 or slit 42 of mask 40. The part recorded is about the right half of section 140C and the left half of section 140D. When it is desired to influence the recording as a function of the seismic signal, the seismic signal is fed through switch 88 in the 3 position to adder 128. This is added to the sawtooth generator waveform 134 and has the effect of moving the "fixed" sweep or wedge 140 either to the right or left with respect to channel 137. Since the seismic signal is added to the sawtooth waveform 134 and both are fed to the vertical amplifier 130, the light intensity wedge 140 is moved to the left or right in accordance with the seismic signal. The effect of moving wedge 140 to the left or right changes the character of the visual recordation made in channel 13. The appearance of different shades within channel 13 indicates whether the seismic signal is of a high, low, or some intermediate amplitude. Various shades of gray can be used with the practical limitations being the ability of the interpreter's eyes to distinguish between the shades.

Also shown in FIG. 1 is a bias voltage source 126 for the cathode ray tube. The source is connectable through switch 114 to rheostats 115A, 115B and 115C when in position 1, 2, and 3 respectively. Each rheostat is pre-adjusted so that a proper bias voltage will be fed to the cathode ray tube for the particular type recording desired when the switches are in their various positions.

Also shown in FIG. 1 is a time line generator 117. It is a well known and widely used process in seismic exploration to put time lines on a seismic record. Generator 117, upon command from computer 24, puts out a pulsed signal which in turn is recorded on the film.

Computer 24 will normally have an output seismic signal ready at the receipt of a pulse from photoelectric cell 70 and recording on recording medium 12 can proceed from trace to trace without interruption. However, in some instances, the computer does not have a signal ready for each rotation of drum 10.

Attention will now be directed toward that part of the system which is used to stop the lateral movement of cathode ray tube 37 in such event when digital computer 24 does not have a signal ready to print out upon receipt of the synchronous pulse from photocell 70 carried by line 76. The synchronous pulse from photocell 70 is illustrated as waveform A in FIG. 3. Reference letters representing the waveform of FIG. 3 appear on FIG. 1 to indicate points of occurrence. In FIG. 3, each wave form has two levels, one is "true," indicated by $t$, and the other "false," indicated by $f$. If digital computer 24 has a signal ready to send out, then it has an output pulse on line 90 which is called a "print command pulse" such as any pulse to start a recorder or display, etc. in correct time. The "print command pulse" is illustrated as the "true" level of waveform B in FIG. 3. If the computer has no output seismic signal, it has an output indicated by the "false" level of waveform B as illustrated at 103. This signal (waveform B) is fed through inverter 92 and the output is illustrated as waveform C which is fed through conduits 94 to "and" gate 96 and through conduit 98 to the set side of flip-flop 100. The synchronous pulse from photocell 70 is inverted by inverter 80 and is fed to a one-shot multivibrator 102. The output from inverter 80 is illustrated as waveform D. The output from one-shot multivibrator 102 is illustrated as E. Pulse 119 of waveform E is of slightly greater time duration than pulse 121 of waveform D. Waveform E is fed to a second one-shot multivibrator 104 whose output is illustrated as waveform F which is fed to "and" gate 96 which must have two true inputs simultaneously to have an output. The output of "and" gate 96 is fed to the "reset" input of flipflop 100. The second one-shot multivibrator 104 is used primarily as a delay. Since both the output of the inverted "print command pulse" (waveform C), when there is no signal, is true and the output of one-shot multivibrator 104 is true, "and" gate 96 would have an output on each synchronous pulse if the multivibrator did not delay the puse. This delay of the synchronous pulse through the two one-shots, prevents flipflop 100 from getting a reset pulse from gate 96 at the same time that a set pulse is given by the inverted print command pulse to flipflop 100. If inverted command print pulse waveform C, and the output pulse waveform F from one-shot 104 are out of phase, that is of opposite polarity, there will be no output from "and" gate 96, indicated by waveform G. If there is no output from gate 96, lateral movement of cathode ray tube 37 continues and there is no interruption in printing. This occurs because computer 24 is delivering a seismic signal.

When there is no true print command signal from digital computer 24, the false output signal is illustrated in waveform B at 103. When it is inverted, it is indicated in waveform C at 101 which is of the same polarity or phase as the waveform F output of one-shot 104 (or delayed synchronous pulse). In such an event then, pulse 145 (of waveform F output of one-shot 104) and level 101 of waveforms C are of the same polarity. This indicates a trace has been dropped. "And" gate 96 then has an output indicated at 111 of waveform G which resets flipflop 100 thus causing it to have a false output illustrated at 149 of waveform H. The false output of flipflop 100 is connected to clutch driver 50A. Clutch driver 50A is of a character to disengage clutch 50 upon receiving a false signal (see segment 149 of waveform H). It should be noted here that clutch driver 50A is such that the clutch remains engaged upon receiving a true signal (see segment 151 of waveform H).

That part of the system which relates directly to applying brake 54A will now be discussed. The false output of flipflop 100 is also fed to a one-shot multivibrator 106 whose output is illustrated at waveform J. The output of one-shot multivibrator 106 is fed to brake driver 54A where it actuates brake 54 in a well known manner, thus stopping the lateral movement of cathode ray tube 37. The applying of the brake is only momentary, the width of pulse 153 of waveform J, e.g. about 20 milliseconds, until inertia of the system i.e., the gears, etc. has stopped. Then the brake is released. However, the clutch remains disengaged during the time it receives a false signal from flipflop 100. This is illustrated at 149 of waveform H. When the output of flipflop 100 is true, as illustrated at 151, clutch 50 is disengaged. As shown above, flipflop 100 has a true output upon computer 24 giving a false output (103 of waveform B) indicating that it does not have a seismic signal ready.

The action which occurs if a trace is "dropped" or the computer 24 has no output signal being fed to converter 82 will now be briefly recapitulated. The false "print command pulse" is indicated by voltage level 103 of waveform B. In such a case, the (a) inverted print command pulse or waveform C indicated at 101 and the (b) output waveform F indicated at 145 of one-shot 104 are in phase (having true outputs). This occurs when a trace has been dropped. The "no signal" part of waveform C indicated at 101, and the part of waveform F from one-shot 104 indicated at 145, will be in phase and will cause an output from "and" gate 96. This ouput of "and" gate 96 resets flipflop 100 which then has a false output and remains false until the waveform B has a true output indicating that the computer 24 has a signal ready. The output of flipflop 100 does two things: (1) It causes clutch driver 50A to disengage clutch 50, and (2) it actuates one-shot multivibrator 106 to have an output indicated at 153 of waveform J which actuates brake driver 54A to engage brake 54, momentarily stopping it. The brake is engaged for about 20 milliseconds which is adequate to stop the lateral movement of cathode ray tube 37 through horizontal bar 38 and traveling block 62 and threaded rod 60. However, the clutch remains disengaged until flipflop 100 has a true output which occurs when the signal on line 90 from computer 24 has the inverted polarity as indicated at 105. When this occurs, the signal is fed to the set input of flipflop 100 but no signal passes through gate 96 (which has a false output indicated at 117) which will not reset input of flipflop 100 inasmuch as the waveforms F and C, as illustrated in 109 and 105 respectively, are out of phase. Flipflop 100 then has a false output indicated at 105 which has no effect on brake driver 54A or clutch driver 50A. The brake remains in its normally released position and clutch 50 remains in its normally engaged position.

If computer 24 has "dropped" a trace, the cathode ray tube should be blanked so that nothing will be printed on recording medium 12. The tube should remain blanked until the computer has a signal to pass to converter 82. Means which provide for this blanking action will now be discussed. "And" gate 160 is provided with two inputs. One input is connected to the print command pulse of computer 24 through conductor 162 which connects to line 90. The other input of "and" gate 160 is connected to the output of synchronizer or trigger circuit 120. The true print command pulse (waveform B of FIG. 3) and the trigger pulse from synchronizer 120 are of the same polarity. The trigger pulses are many times the frequency of the print command pulse; thus every time the trigger pulse occurs, "and" gate 160 has an output pulse if the print command pulse is true. The output of "and" gate 160 is fed through conductor 163 to cathode ray tube bias 126. The output of "and" gate 160, which is a series of trigger pulses, operates the bias 126 in a well known manner. However if the computer 24 has dropped a signal, i.e., has no signal ready to reproduce, then the print command pulse is false and "and" gate 160 has no output. As "and" gate 160 has no output the bias 120 will be at such a level that cathode ray tube 37 will be blanked.

While there are above disclosed but a limited number of embodiments of the system of this invention herein presented, it is possible to produce still other embodiments without departing from the inventive concept herein disclosed. It is therefore desired that only such limitations be imposed on the appended claims as are stated therein.

What is claimed is:

1. A system for reproducing in visual form seismic signals in a side-by-side relationship which have been stored in a storage means which is capable of reading sequentially the next stored seismic signal upon receiving a synchronizing pulse, said storage means being capable of generating a distinctive print command pulse when reading out a seismic signal which is different from a no print command pulse generated when no seismic signal is being read out which comprises: a rotatable drum having a photosensitive recording medium thereon; means to produce a synchronizing pulse upon each rotation of said drum; transmission means for transmitting the synchronizing pulse to said storage means; cathode ray tube means; means to continually move the cathode ray tube means laterally along a line parallel to the axis of said rotating drum; means for exposing the photosensitive recording medium to a selected area of the face of said cathode ray tube means; means to control the visual character of the beam of light on said selected area as a function of the seismic signal; means to rotate said drum at a speed in proportion to the movement of said cathode ray tube means; and means to stop the lateral movement of said cathode ray tube means and render it inoperative during the time that the storage means is not reading out a seismic signal.

2. An apparatus as defined in claim 1, including a driving means, a clutch means, a brake means and means to rotate said drum, in which the means to stop the lateral movement of said cathode ray tube means includes a first inverter electrically connected to said means for generating a synchronizing pulse; a second inverter electrically connected to the storage means so as to receive a print common pulse therefrom; means connecting the output of said second inverter to an "and" gate; delay means for delaying the output of said first inverter; means electrically connecting the output of said delay means to said "and" gate, a flipflop having set and reset inputs; means electrically connecting the output of said gate to the reset of said flipflop; means connecting the output of said second inverter to the set input of said flipflop; means electrically connecting the output of said flipflop to the cutoff of the light beam in said cathode ray tube means; second means connecting the output of said flipflop to a clutch means so that the clutch can be disengaged from the first driving means; means for applying a pulse signal to the brake means to temporarily engage said brake upon said flipflop having an output.

3. An apparatus as defined in claim 1 in which the means to control the cathode ray tube means with the seismic signal includes a staircase generator means; a sawtooth generator means; means synchronizing the staircase generator means and said sawtooth generator means such that the period of repeating for each is the same; adding means for adding the output of said sawtooth generator with said seismic signal; means connecting the output of said adding means to the Y axis of said cathode ray tube means; means connecting the output of said staircase generator to the Z axis of said cathode ray tube means.

4. An apparatus as defined in claim 1 in which the means to control the cathode ray tube means with the seismic signal includes means connecting the analog seismic signal to the Z axis of said oscilloscope and means to sweep the beam of light across the Y axis of the face of said cathode ray tube means at a rate much higher than the frequency of the seismic signal.

5. A system for recording in a side-by-side relationship on a recording medium seismic signals from a storage means capable of reading sequentially the next stored signal upon receiving a synchronizing pulse which comprises: a rotatable drum upon which to mount said recording medium; means to rotate said drum at a constant speed; an oscilloscope means; optical means between the oscilloscope means and the drum so that a selected area of the face of the oscilloscope means is exposed to the periphery of the drum; means to control the visual character of the beam on the face of the oscilloscope means as a function of the seismic signal; means to move the oscilloscope means and optical means in a direction parallel to the axis of said drum at a constant velocity; control means to direct the storage means to produce a signal upon each rotation of said drum, said control means including means to stop the lateral movement of said oscilloscope means in event the storage means fails to read out a signal.

6. An apparatus as defined in claim 5 in which the means to control the visual character of the beam on the face of the oscilloscope means includes a staircase generator means; a sawtooth generator means; means synchronizing the staircase generator means and said sawtooth generator means such that the period repeating each is the same; adding means for adding the output of said sawtooth generator with said seismic signal; means connecting the output of said adding means to the Y axis of said oscilloscope means; means connecting the output of said staircase generator to the Z axis of said oscilloscope means.

7. An apparatus as defined in claim 5 in which the control means includes a transparent disc attached to the axis of said drum and rotatable therewith, said transparent disc having an opaque area thereon, a light source spaced on one side of said disc, a photoelectric cell on the opposite side of said transparent disc and arranged to receive light from said light source and of a character to have an output pulse upon the interruption of light by said opaque area.

8. A system for recording in a side-by-side relationship on a recording medium seismic signals from a storage means capable of reading sequentially the next stored signal upon receiving a synchronizing pulse which comprises:

a rotatable drum upon which to mount a recording medium;
means for rotating said drum at a constant speed;
oscilloscope means;
optical means between the oscilloscope means and the drum so that a selected area of the face of the oscilloscope means is exposed to the periphery of the drum;

means for controlling the visual character of the beam on the face of the oscilloscope means as a function of the seismic signal;

means for moving the oscilloscope means and optical means in a direction parallel to the axis of said drum at a constant velocity; and control means for directing the storage means to produce the next seismic signal upon the completion of each rotation of said drum.

9. An apparatus as defined in claim 8 in which the means to control the visual character of the beam on the face of the oscilloscope means includes:

a staircase generator means;

a sawtooth generator means;

means for synchronizing the staircase generator means and said sawtooth generator means such that the period repeating each is the same;

adding means for adding the output of said sawtooth generator with said seismic signal;

means connecting the output of said adding means to the Y axis of the said oscilloscope means; and means connecting the output of said staircase generator to the Z axis of said oscilloscope means.

10. An apparatus as defined in claim 8 in which the control means includes:

a transparent disc attached to the axis of said drum and rotatable therewith, said transparent disc having an opaque area thereon;

a light source spaced on one side of said disc; and a photographic cell on the opposite side of said transparent disc and arranged to receive light from said light source and of a character to have an output upon the interruption of light by the said opaque area.

References Cited in the file of this patent
UNITED STATES PATENTS

| | | |
|---|---|---|
| 3,025,123 | Klein | Mar. 13, 1962 |
| 3,025,125 | Walker | Mar. 13, 1962 |
| 3,038,661 | Klein | June 12, 1962 |
| 3,061,813 | Geyer | Oct. 30, 1962 |